(12) United States Patent
Kim et al.

(10) Patent No.: US 10,429,939 B2
(45) Date of Patent: Oct. 1, 2019

(54) APPARATUS FOR PROJECTING IMAGE AND METHOD FOR OPERATING SAME

(71) Applicant: LG ELECTRONICS INC., Seoul (KR)

(72) Inventors: Kyoungjoung Kim, Seoul (KR); Hyunhee You, Seoul (KR); Yeonjoo Joo, Seoul (KR); Sooji Yeom, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/507,751

(22) PCT Filed: Sep. 3, 2014

(86) PCT No.: PCT/KR2014/008285
§ 371 (c)(1),
(2) Date: Feb. 28, 2017

(87) PCT Pub. No.: WO2016/032039
PCT Pub. Date: Mar. 3, 2016

(65) Prior Publication Data
US 2017/0285760 A1    Oct. 5, 2017

(30) Foreign Application Priority Data
Aug. 28, 2014  (KR) .................. 10-2014-0113439

(51) Int. Cl.
*G06F 3/01* (2006.01)
*G06F 3/03* (2006.01)
*H04N 9/31* (2006.01)

(52) U.S. Cl.
CPC ............ *G06F 3/017* (2013.01); *G06F 3/0304* (2013.01); *H04N 9/3194* (2013.01);
(Continued)

(58) Field of Classification Search
CPC . G06F 2203/04108; G06F 2203/04101; G06F 3/017; G06F 3/041–0418; G06F 3/042–0428; G06F 3/0481–04886
See application file for complete search history.

(56) References Cited

U.S. PATENT DOCUMENTS

2008/0244468 A1* 10/2008 Nishihara ............... G06F 3/017
                                                                   715/863
2012/0154595 A1  6/2012 Sassi
(Continued)

FOREIGN PATENT DOCUMENTS

JP      2013-008368      1/2013
JP      2014-029656      2/2014
(Continued)

OTHER PUBLICATIONS

PCT International Application No. PCT/KR2014/008285, International Search Report dated Apr. 22, 2015, 4 pages.

*Primary Examiner* — David Tung
(74) *Attorney, Agent, or Firm* — Lee, Hong, Degerman, Kang & Waimey

(57) ABSTRACT

An apparatus for projecting an image, according to one embodiment of the present invention, projects an image, detects a user gesture operation in an area between an image screen area, where an image screen corresponding to the projected image is displayed, and the apparatus for projecting an image, and carries out a control operation corresponding to the detected gesture operation. The operation of detecting the user gesture operation includes distinguishing, into a plurality of areas, the area between the image screen area and the apparatus for projecting an image, and detecting the user gesture operation with respect to the plurality of distinguished plurality of areas.

16 Claims, 21 Drawing Sheets

(52) U.S. Cl.
   CPC ......... *H04N 9/3182* (2013.01); *H04N 9/3185* (2013.01); *H04N 9/3188* (2013.01)

(56) References Cited

U.S. PATENT DOCUMENTS

| | | | |
|---|---|---|---|
| 2012/0229377 A1* | 9/2012 | Kim | G06F 3/017 |
| | | | 345/157 |
| 2012/0235892 A1* | 9/2012 | Narendra | G06F 3/017 |
| | | | 345/156 |
| 2014/0218300 A1* | 8/2014 | Muraki | G03B 17/54 |
| | | | 345/168 |
| 2016/0080708 A1* | 3/2016 | Urata | H04N 9/3147 |
| | | | 348/744 |

FOREIGN PATENT DOCUMENTS

| | | |
|---|---|---|
| KR | 10-2010-0029166 | 3/2010 |
| KR | 10-2012-0128348 | 11/2012 |

* cited by examiner

APPARATUS FOR PROJECTING IMAGE AND METHOD FOR OPERATING SAME

CROSS-REFERENCE TO RELATED APPLICATIONS

This application is the National Stage filing under 35 U.S.C. 371 of International Application No. PCT/KR2014/008285, filed on Sep. 3, 2014, which claims the benefit of earlier filing date and right of priority to Korean Application No. 10-2014-0113439, filed on Aug. 28, 2014, the contents of which are all hereby incorporated by reference herein in their entirety.

BACKGROUND OF THE INVENTION

1. Field of the Invention

The present invention relates to an image projection apparatus and a method of operating the same and, more particularly to an image projection apparatus for sensing a user gesture related to a projected image and performing operation corresponding to the sensed user gesture, and a method of operating the same.

2. Description of the Related Art

Recently, a method of displaying an image includes a method of displaying an image through a display apparatus and a method of displaying an image through an image projection apparatus such as a projector.

Upon displaying an image through a display apparatus, there is a limit on screen size and an image should be displayed only on the screen of the display apparatus.

In contrast, an image projection apparatus such as a projector can provide a greater screen size than that of the display apparatus and can display an image at various positions according to image projection direction.

However, in the image projection apparatus, the size and quality of a displayed image may be significantly changed according to a distance and angle between an image projection place and the image projection apparatus. Therefore, it is necessary to appropriately adjust the quality of the image projected by the image projection apparatus according to the distance between the image projection place and the image projection apparatus.

Recently, a touch type input method of enabling a user to directly touch a screen of a display apparatus using various touch methods is widely used. In the touch type input method, since a user can directly touch a displayed screen, the user can intuitively recognize an input method and a use method. However, an image projection apparatus does not have a display and thus cannot receive user input using a touch method.

SUMMARY OF THE INVENTION

An object of the present invention is to project an image corresponding to a distance to an image projection place to provide a high-quality image to a user.

In addition, another object of the present invention is to recognize a user gesture related to a projected screen to perform control operation of a projected image.

According to an aspect of the present invention, there is a method of operating an image projection apparatus including projecting an image, sensing a user gesture in an area between an image screen area, in which an image screen corresponding to the projected image is displayed, and the image projection apparatus, and performing control operation corresponding to the sensed gesture.

According to another aspect of the present invention, there is an image projection apparatus including an image projection unit configured to project an image, a sensing unit configured to sense a user gesture in an area between an image screen area, in which an image screen corresponding to the projected image is displayed, and the image projection apparatus, and a controller configured to perform control operation corresponding to the user gesture sensed by the sensing unit.

DETAILED DESCRIPTION OF THE PREFERRED EMBODIMENTS

Reference will now be made in detail to the preferred embodiments of the present invention, examples of which are illustrated in the accompanying drawings. The suffixes "module" and "unit" in elements used in description below are given only in consideration of ease in preparation of the specification and do not have specific meanings or functions. Therefore, the suffixes "module" and "unit" may be used interchangeably.

Hereinafter, a method of operating an image projection apparatus and an image projection apparatus using the same according to an embodiment of the present invention will be described in detail with reference to the accompanying drawings.

The image projection apparatus according to the embodiment of the present invention is, for example, an intelligent image projection apparatus having a broadcast reception function and a computer supporting function. The image projection apparatus further includes an Internet function in addition to a broadcast reception function and has a convenient interface, such as a voice recognition, gesture recognition or handwriting input device, a touch screen or a pointing device. The image projection apparatus may be connected to the Internet and a computer through a wired or wireless Internet function to perform e-mail, web browsing, banking and gaming. A general-purpose OS may be used for various functions.

Accordingly, the image projection apparatus described in the present invention may perform various user-friendly functions, because various applications are freely added to or deleted from a general-purpose OS. The image projection apparatus may be an image projector, for example, and is applicable to a smartphone in some cases.

Figure 1:
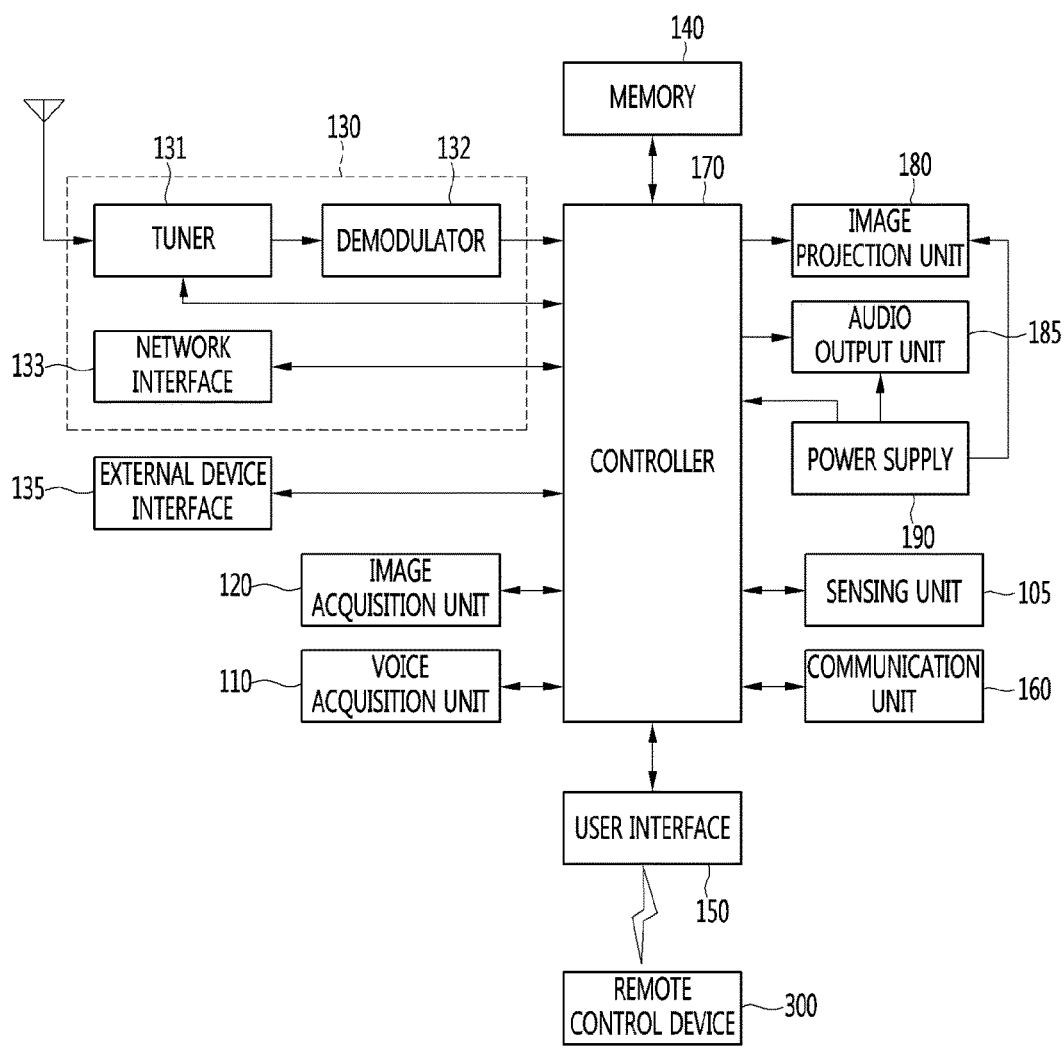
FIG. 1 is a block diagram showing the configuration of an image projection apparatus according to an embodiment of the present invention.

FIG. 1 is a block diagram showing the configuration of an image projection apparatus according to an embodiment of the present invention.

Referring to FIG. 1, the image projection apparatus 100 may include a sensing unit 105, a voice acquisition unit 110, an image acquisition unit 120, a broadcast reception unit 130, an external device interface 135, a memory 140, a user input interface 150, a communication unit 160, a controller 170, an image projection unit 180, an audio output unit 185 and a power supply 190.

The sensing unit 105 may include one or more sensors for sensing at least one of internal information of the image projection apparatus, peripheral environment information of the image projection apparatus and user information. For example, the sensing unit 105 may include at least one of a distance sensor 106, a proximity sensor, an illumination sensor, a touch sensor, an acceleration sensor, a magnetic sensor, a gravity sensor, a gyroscope sensor, a motion sensor 107, an RGB sensor, an infrared (IR) sensor, a fingerprint sensor, an ultrasonic sensor, an optical sensor, a battery gauge, an environment sensor (e.g., a barometer, a hygrometer, a thermometer, a radiation sensor, a heat sensor, a gas sensor, etc.) and a chemical sensor (e.g., e-nose, a healthcare sensor, a biometric sensor, etc.). Meanwhile, the image projection apparatus 100 disclosed in the present specification may use a combination of information sensed by at least two of the sensors.

The voice acquisition unit 110 may acquire voice.

The voice acquisition unit 110 may include at least one microphone and acquire voice through the microphone.

The voice acquisition unit 110 may deliver the acquired voice to the controller 170.

The image acquisition unit 120 may acquire an image.

The image acquisition unit 120 may include at least one camera and may acquire an image through the camera. The image acquisition unit 120 may acquire the image of a user. In addition, the image acquisition unit 120 may acquire the biometric information such as an image of the iris or veins of the user.

The image acquisition unit 120 may deliver the acquired information to the controller 170.

The voice acquisition unit 110 and the image acquisition unit 120 may be included in the user input interface 150.

Meanwhile, the broadcast reception unit 130 may include a tuner 131, a demodulator 132 and a network interface 133.

The external device interface 135 may receive and deliver an application or an application list in an adjacent external device to the controller 170 or the memory 140.

The external device interface 135 may include a terminal for connection with an external device and may be connected to a connector of the external device.

The external device interface 135 may supply power received from the power supply 190 to the connected external device as driving power.

In addition, the external device interface 135 may deliver an operation signal received from the external device to the controller 170.

Meanwhile, the external device interface 135 may include a sensor for sensing connection with the external device and may recognize connection with the external device.

The network interface 133 may provide an interface for connecting the image projection apparatus 100 to a wired/wireless network including an Internet. The network interface 133 may transmit or receive data to or from another user or another electronic apparatus through a connected network or another network linked to the connected network.

In addition, some content stored in the image projection apparatus 100 may be transmitted to a selected user or a selected electronic apparatus among other users or other electronic apparatuses pre-registered with the image projection apparatus 100.

The network interface 133 may access a predetermined webpage through a connected network or another network linked to the connected network. That is, the network interface may access the predetermined webpage through the network to transmit or receive data to or from the server.

The network interface 133 may receive content or data provided by a content provider or a network operator. That is, the network interface 133 may receive content such as movies, advertisements, games, VOD, broadcast signals, etc. and information related thereto from the content provider or the network provider through the network.

In addition, the network interface 133 may receive update information and update files of firmware provided by the network operator and transmit data to the Internet, the content provider or the network operator.

The network interface 133 may select and receive a desired application of applications open to the public through the network.

The memory 140 may store programs for signal processing and control of the controller 170 and store video, audio or data signals subjected to signal processing.

In addition, the memory 140 may temporarily store video, audio or data signals received from the external device interface 135 or the network interface 133 or store information on a predetermined image through a channel storage function.

The memory 140 may store an application or an application list received from the external device interface 135 or the network interface 133.

In addition, the memory 140 may store biometric information of a user. Here, the biometric information of the user may include unique information related to the body of the user, such as fingerprint, iris, face or voice of the user.

The image projection apparatus 100 may reproduce and provide a content file (a moving image file, a still image file, a music file, a document file, an application file, etc.) stored in the memory 140 to the user.

The memory 140 may store personalized service information of the user. Here, the personalized service information of the user may include at least one of functions frequently used by the user, channels frequently viewed by the user and setting values set by the user. The personalized service information of the user may include information on personalized functions and personalized menus of a plurality of users.

The user input interface 150 may deliver a signal input by the user to the controller 170 or deliver a signal from the controller 170 to the user. For example, the user input interface 150 may receive and process control signals such as power on/off, channel selection and screen settings from the remote control device 300 or transmit and process a control signal from the controller 170 to the remote control device 300, according to various communication methods such as Bluetooth, Ultra Wideband (UWB), ZigBee, radio frequency (RF) communication or infrared (IR) communication.

In addition, the user input interface 150 may deliver a control signal received through a local key such as a power key, a channel key, a volume key or a setting key to the controller 170.

The communication unit 160 may include one or more modules enabling wired or wireless communication between the image projection apparatus 100 and the network or between the image projection apparatus 100 and a peripheral device. Here, the peripheral device may include one or more of the below-described terminal 200 and the remote control device 300.

For example, the communication unit 160 may include an Internet module for Internet access and enable the image projection apparatus 100 to access the Internet through the Internet module by wire or wirelessly.

As another example, the communication unit 160 may include a short-range communication module for enabling the image projection apparatus 100 to wirelessly communicate with another device. As one embodiment, the short-range communication module included in the communication unit 160 may include Bluetooth, Radio Frequency IDentification (RFID), Infrared Data Association (IrDA), Ultra-WideBand (UWB), ZigBee, wireless LAN (WLAN) (Wi-Fi), Near Field Communication (NFC), etc. The other device may be the below-described terminal 200.

The video signal processed by the controller 170 may be input to the image projection unit 180 to display video corresponding to the video signal. In addition, the video signal processed by the controller 170 may be input to an external output device through the external device interface 135.

The audio signal processed by the controller 170 may be input to the audio output unit 185 to output audio. In addition, the audio signal processed by the controller 170 may be input to an external device through the external device interface 135.

The controller 170 may control the overall operation of the image projection apparatus 100.

The controller 170 may receive a sense signal for connection of an external device from the external device interface and control the power supply 190 to deliver driving power to the connected external device through the external device interface 135.

In addition, the controller 170 may recognize voice acquired through the voice acquisition unit 110 and perform control operation corresponding to the recognized voice.

In addition, the controller 170 may compare a plurality of voice signals corresponding to the voice of the user, recognize a voice signal having best quality and perform control operation corresponding to the recognized voice.

The controller 170 may compare a plurality of voices acquired by the voice acquisition unit 110 having a plurality of microphones and determine the location of the user. More specifically, the controller 170 may compare voices acquired by the plurality of microphones and determine the location of the user who has spoken.

Meanwhile, the controller 170 may control the image projection apparatus 100 using a user command input through the user input interface 150 or an internal program and access the network to download an application or application list desired by the user to the image projection apparatus 100.

The controller 170 may output channel information selected by the user through the image projection unit 180 or the audio output unit 185 along with the processed video or audio signal.

In addition, the controller 170 may output, through the image projection unit 180 or the audio output unit 185, the video signal or the audio signal received from an external device, for example, the camera or the camcorder through the external device interface 135, according to an external device image reproduction command received through the user input interface 150.

Meanwhile, the controller 170 may control the image projection unit 180 to display an image and to project a broadcast image received through the tuner 131, an external input image received through the external device interface 135, an image received through the network interface or an image stored in the memory 140. In this case, the image projected by the image projection unit 180 may be a still image or a moving image and may be a 2D image or a 3D image.

In addition, the controller 170 may perform control to project content stored in the image projection apparatus 100, received broadcast content or external input content. The content may be a broadcast image, an external input image, an audio file, a still image, an accessed webpage and a document file.

In addition, the controller 170 may compare one or more of the input biometric information and pattern information of the user with one or more of the pre-stored biometric information and pattern information. The controller 170 may retrieve the same biometric information as the user from one or more of the pre-stored biometric information and pattern information.

In addition, the controller 170 may acquire personalized service information of the user corresponding to one or more of the biometric information and pattern information input based on one or more of the input biometric information and pattern information of the user. For example, the controller 180 may recognize the user based on the received fingerprint image or fingerprint information of the user. The controller 180 may acquire personalized service information corresponding to the recognized user.

In addition, the controller 170 may adjust an image to be projected based on a distance to an image projection place.

The image projection unit 180 may project various images.

The image projection unit 180 may include a light source unit 181, a lens unit 182 and a reflection unit 183.

The light source unit 181 emits a beam.

The lens unit 182 selectively transmits only a predetermined wavelength of the beam generated by the light source unit 181.

The reflection unit 183 reflects the beam transmitted by the lens unit 182. In addition, the reflection unit 183 may rotate in all directions and reflect the transmitted beam in various directions.

The image projection unit 180 may project the beam emitted from the light source unit 181 onto an image projection place through the lens unit 182.

In addition, in the image projection unit 180, the beam emitted from the light source unit 181 may pass through the lens unit 182 and reflect off of the reflection unit 183 to project an image onto a projection place.

This will be described with reference to FIGS. 2 and 3.

Figure 2:
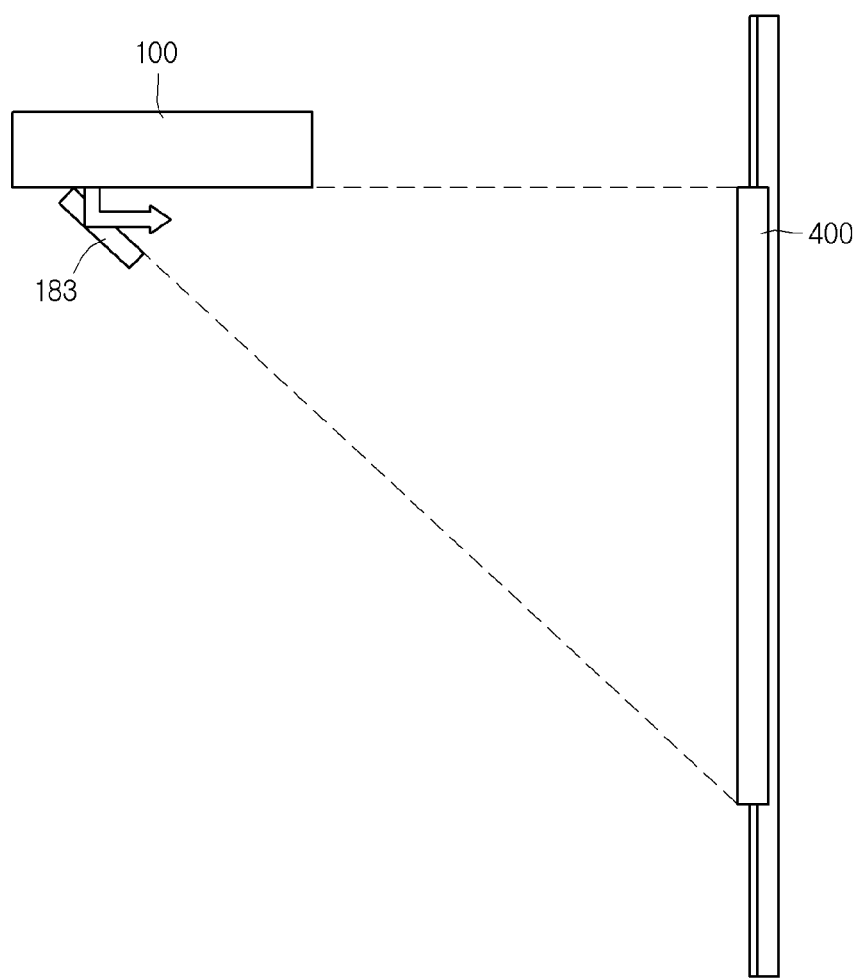
FIG. 2 is a diagram showing the concept of image projection according to an embodiment of the present invention.

FIG. 2 is a diagram showing the concept of image projection according to an embodiment of the present invention.

Referring to FIG. 2, in the image projection unit 180, the beam emitted from the light source unit 181 may pass through the lens unit 182 and reflect off of the reflection unit 183 to project an image onto a projection place. An image screen 400, on which the image projected by the image projection unit 180 is displayed, may be displayed on an image projection surface.

Figure 3:
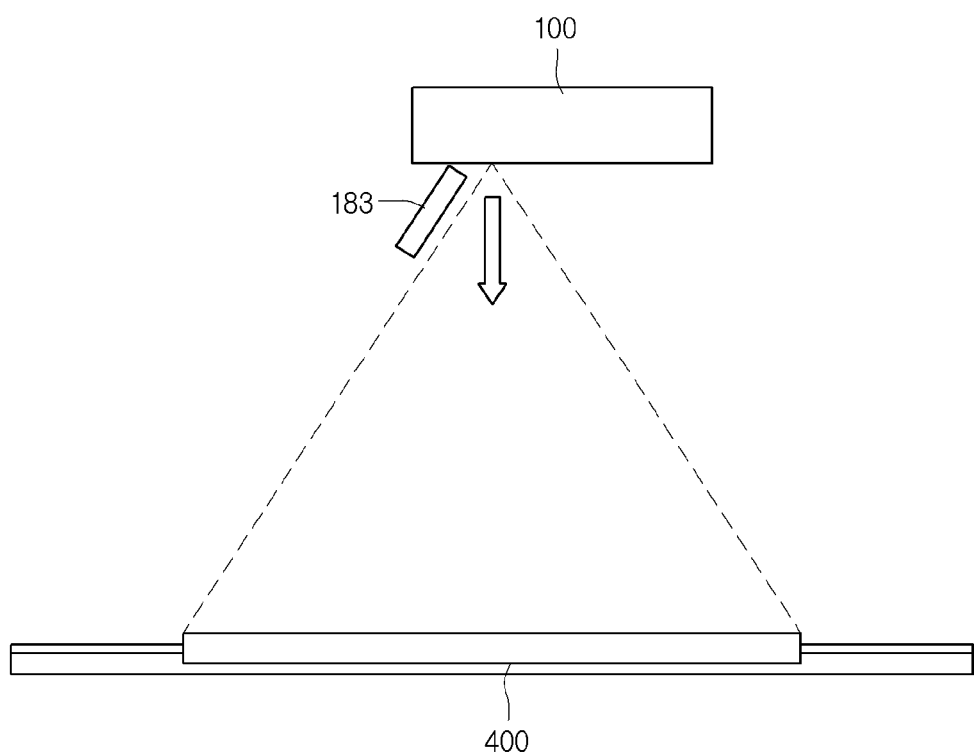
FIG. 3 is a diagram showing the concept of image projection according to another embodiment of the present invention.

FIG. 3 is a diagram showing the concept of image projection according to another embodiment of the present invention.

Referring to FIG. 3, in the image projection unit 180, the beam generated by the light source unit 181 passes through the lens unit 182 to project an image onto a projection place. An image screen 400, on which the image projected by the image projection unit 180 is displayed, may be displayed on an image projection surface.

The image projection unit 180 may project the image in various projection directions using the reflection unit 183.

The image projection method of the image projection unit 180 is well known and a detailed description thereof will thus be omitted.

The image projection unit 180 may convert the video signal, data signal or OSD signal processed by the controller 170 or the video signal or data signal received from the external device interface 135 into RGB signal and generate a drive signal.

Meanwhile, the image projection apparatus 100 shown in FIG. 1 is merely exemplary and thus some of the shown components may be combined or omitted or other components may be added according to the type of the image projection apparatus 100.

That is, two or more components may be combined or one component may be divided into two or more components, if necessary. In addition, the functions performed by each block merely serve illustrate the embodiments of the present invention and details of operations or devices do not restrict the scope of the present invention.

According to another embodiment of the present invention, the image projection apparatus 100 may receive and reproduce an image through the network interface 133 or the external device interface 135, without the tuner 131 and the demodulator 132, unlike FIG. 1.

For example, the image projection apparatus 100 may be implemented by an image processing device for receiving broadcast signals or content according to various network services, such as a set-top box, and a content reproduction device for reproducing content received from the image processing device.

In this case, an image display method according to an embodiment of the present invention may be performed by the image projection apparatus 100 described with reference to FIG. 1, the image processing device such as the set-top box or a content reproduction device including the image projection unit 180 and the audio output unit 185.

Next, a terminal 200 according to an embodiment of the present invention will be described with reference to FIG. 4.

Figure 4:
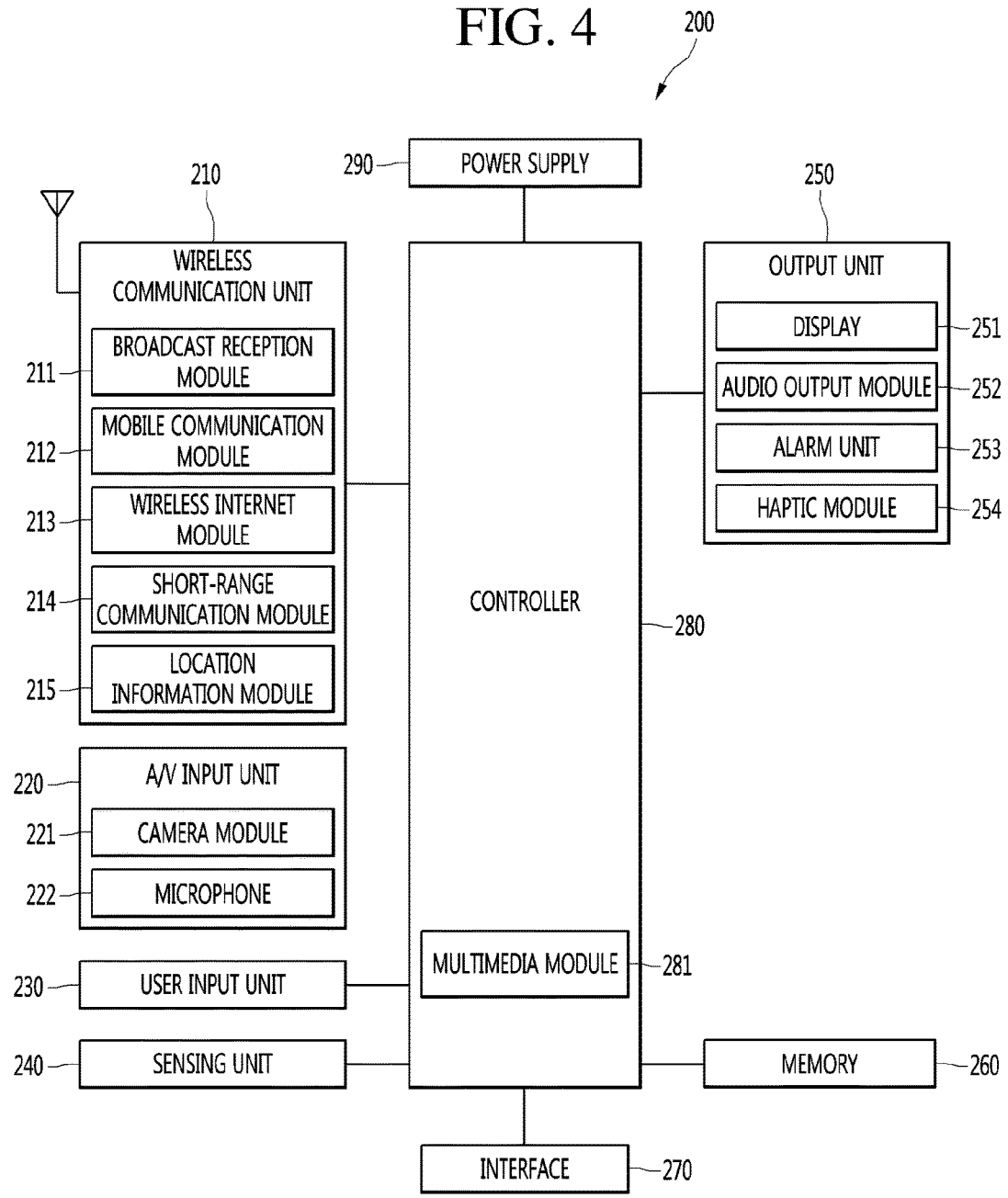
FIG. 4 is a block diagram showing a terminal according to an embodiment of the present invention.

FIG. 4 is a block diagram showing a terminal 200 according to an embodiment of the present invention.

Referring to FIG. 4, the terminal 200 may include a wireless communication unit 210, an audio/video (A/V) input unit 220, a user input unit 230, a sensing unit 240, an output unit 250, a memory 260, an interface 270, a controller 280 and a power supply 290. The components shown in FIG. 4 are not mandatory and the terminal may be implemented by different number of components.

Hereinafter, the components will be sequentially described.

The wireless communication unit 210 may include one or more modules for enabling wireless communication between the terminal 200 and the network or between the terminal 200 and the image projection apparatus 100. For example, the wireless communication unit 210 may include at least one of a broadcast reception module, a mobile communication module, a wireless Internet module, a short-range communication module and a location information module.

The A/V input unit 220 is used to input an audio signal or a video signal and may include a camera 221 and a microphone 222. The camera 221 processes an image frame of a still image or a moving image obtained by an image sensor in a video call mode or a capture mode. The processed image frame may be displayed through the display unit 251.

The image frame processed by the camera 221 may be stored in the memory 260 or transmitted to an external device through the wireless communication unit 210. Two or more cameras may be provided according to use environments thereof.

The microphone 222 receives an external sound signal through a microphone and processes the external sound signal into electrical voice data in a call mode, a recoding mode or a voice recognition mode. The processed voice data may be converted into a format transmittable to a mobile communication base station through the wireless communication unit 210, in a call mode. Various noise cancellation algorithms for cancelling noise generated in a process of receiving an external sound signal may be implemented in the microphone 222. Two or more microphones 222 may be provided according to use environments thereof.

The user input unit 230 generates input data for operation control of the terminal 200 by the user. The user input unit 230 may include a key pad, a dome switch, a touch pad (resistive/capacitive), a jog wheel, a jog switch, etc.

The sensing unit 240 may include one or more sensors for sensing at least one of internal information of the terminal, peripheral environment information of the terminal and user information. For example, the sensing unit 240 may include at least one of a proximity sensor 241, an illumination sensor 242, a touch sensor, an acceleration sensor, a magnetic sensor, a gravity sensor, a gyroscope sensor, a motion sensor, an RGB sensor, an infrared (IR) sensor, a fingerprint sensor, an ultrasonic sensor, an optical sensor (e.g., a camera 221 or a microphone 222), a battery gauge, an environment sensor (e.g., a barometer, a hygrometer, a thermometer, a radiation sensor, a heat sensor, a gas sensor, etc.), and a chemical sensor (e.g., e-nose, a healthcare sensor, a biometric sensor, etc.). Meanwhile, the mobile terminal disclosed in the present specification may use a combination of information sensed by at least two of the sensors.

The sensing unit 240 senses the current state of the terminal 200 such as the opened or closed state of the terminal 200, the location of the terminal 200, user contact or non-contact, the direction of the terminal or acceleration/deceleration of the terminal and generates a sensing signal for controlling operation of the terminal 200. For example, if the terminal 200 is a slide phone, whether the slide phone is open or closed may be sensed. In addition, whether the power supply 290 supplies power or whether an external device is connected to the interface 270 may be sensed.

The output unit 250 is used to generate visual, audible or tactile outputs and may include a display 251, an audio output module 252, an alarm unit 253, a haptic module 254, etc.

The display 251 displays (i.e. outputs) information processed by the mobile terminal 200. For example, if the mobile terminal 200 is in the call mode, a UI or Graphical User Interface (GUI) related to a call is displayed on the display 251. If the mobile terminal 200 is in the video call mode or capture mode, a captured and/or received image, a UI, or a GUI is displayed on the display 251.

The display 251 may include at least one of a Liquid Crystal Display (LCD), a Thin Film Transistor-LCD (TFT-LCD), an Organic Light-Emitting Diode (OLED) display, a flexible display, and a three-dimensional (3D) display.

If the display 251 and a sensor for sensing touch (hereinafter, referred to as a touch sensor) 244 are layered, the display 251 can be used not only as an output device but also as an input device. The touch sensor 244 may take the form of, for example, a touch film, a touch sheet, a touch pad, etc.

The touch sensor 244 may convert variation in pressure applied at or in capacitance generated from a specific position of the display 251 into an electrical input signal. The touch sensor 244 may detect a touch pressure as well as a touched position and area.

Upon sensing touch input, the touch sensor 244 outputs a touch signal or touch signals corresponding to the touch input to a touch controller. The touch controller processes the touch signal or signals and provides the processed signal or signals to the controller 280. Thus, the controller 280 identifies a touched area of the display 251.

The audio output module 252 may output audio data received from the wireless communication unit 210 or stored in the memory 260 in a call signaling mode, call mode, recording mode, voice recognition mode, or broadcast reception mode. The audio output module 252 also outputs a sound signal (e.g. an incoming call ringtone, an incoming message ringtone, etc.) related to a function performed by the terminal 200. The audio output module 252 may include a receiver, a speaker, a buzzer, etc.

The alarm module 253 outputs a signal indicating occurrence of an event in the terminal 200. Examples of the event occurring in the mobile terminal may include incoming call signaling, message reception, key input, touch input, etc. The alarm module 253 may notify occurrence of an event using a signal other than a video or audio signal, for example, vibration. Considering that the video or audio signal can be output through the display 251 or the audio output module 252, the display 251 or the audio output module 252 may be regarded as a part of the alarm module 253.

The haptic module 254 generates various haptic effects to the user. A major example of the haptic effects is vibration. The strength and pattern of vibrations generated from the haptic module 254 can be controlled. For instance, different kinds of vibrations may be combined or sequentially output.

The memory 260 may store programs needed for operations of the controller 280 and may temporarily store input data and output data (e.g. a phonebook, a message, a still image, a moving image, etc.). The memory 260 may store data regarding vibrations of various patterns and sounds that are output when the touchscreen is touched. The memory 260 may include at least one of flash memory-type storage medium, a hard disk-type storage medium, a multimedia card micro type storage medium, a card-type memory (e.g. Secure Digital (SD) or eXtreme Digital (XD)), a Random Access Memory (RAM), a Static Random Access memory (SRAM), a Read-Only Memory (ROM), an Electrically Erasable Programmable ROM (EEPROM), a Programmable Read-only Memory (PROM), a magnetic memory, a magnetic disk and an optical disc. The terminal 200 may operate on the Internet in regard to a web storage for performing the storage function of the memory 260.

The interface 270 serves as an interface for external devices to be connected with the terminal 200. For example, the interface 270 can receive data transmitted from an external device, receive power to transfer to elements and components within the terminal 200, or transmit internal data of the terminal 200 to an external device. The interface 270 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating a use authority of the terminal 200 and may include a user identity module (UIM), a subscriber identity module (SIM), a universal subscriber identity module (USIM), and the like. In addition, the device having the identification module (also referred to herein as an "identifying device") may be manufactured in the form of a smart card. Accordingly, the identifying device can be connected with the terminal 200 via a port.

The controller 280 generally provides overall control to the terminal 200. For instance, the controller 280 performs control operations and processes in relation to a voice call, data communication, a video call, etc. The controller 280 may include a multimedia module 281 for multimedia reproduction. The multimedia module 281 may be included in the controller 280 or may be provided separately from the controller 280.

The controller 280 can also perform pattern recognition processing to recognize handwriting input or a picture drawing input performed on the touchscreen as characters or images.

In addition, the controller 280 may acquire information on movement of the user based on the sensing value acquired by the sensing unit 240. For example, the controller 280 may acquire movement distance and movement speed of the user and calculate calories consumed by the user.

The power supply 290 receives external power or internal power and supplies power to each component, for the operation of each component, under control of the controller 280.

Meanwhile, the mobile terminal may include a wearable device wearable by the user in addition to a handheld device. The wearable device may include a smart watch, smart glasses or a head mounted display (HMD). Hereinafter, examples of the wearable device will be described.

The wearable device is able to exchange data with another terminal 200 (or otherwise cooperate with the terminal 200). The short-range communication module 214 may sense or recognize the wearable device, and permit communication between the wearable device and the terminal 200. In addition, when the sensed wearable device is a device which is authenticated to communicate with the terminal 100, the controller 280, for example, may cause transmission of data processed in the terminal 200 to the wearable device via the short-range communication module 214. Hence, a user of the wearable device may use the data processed in the terminal 200 on the wearable device. For example, when a call is received by the terminal 200, the user may answer the call using the wearable device. Also, when a message is received by the terminal 200, the user can check the received message using the wearable device.

Hereinafter, a method of operating the image projection apparatus 100 will be described with reference to FIGS. 5 to 22.

Figure 5:
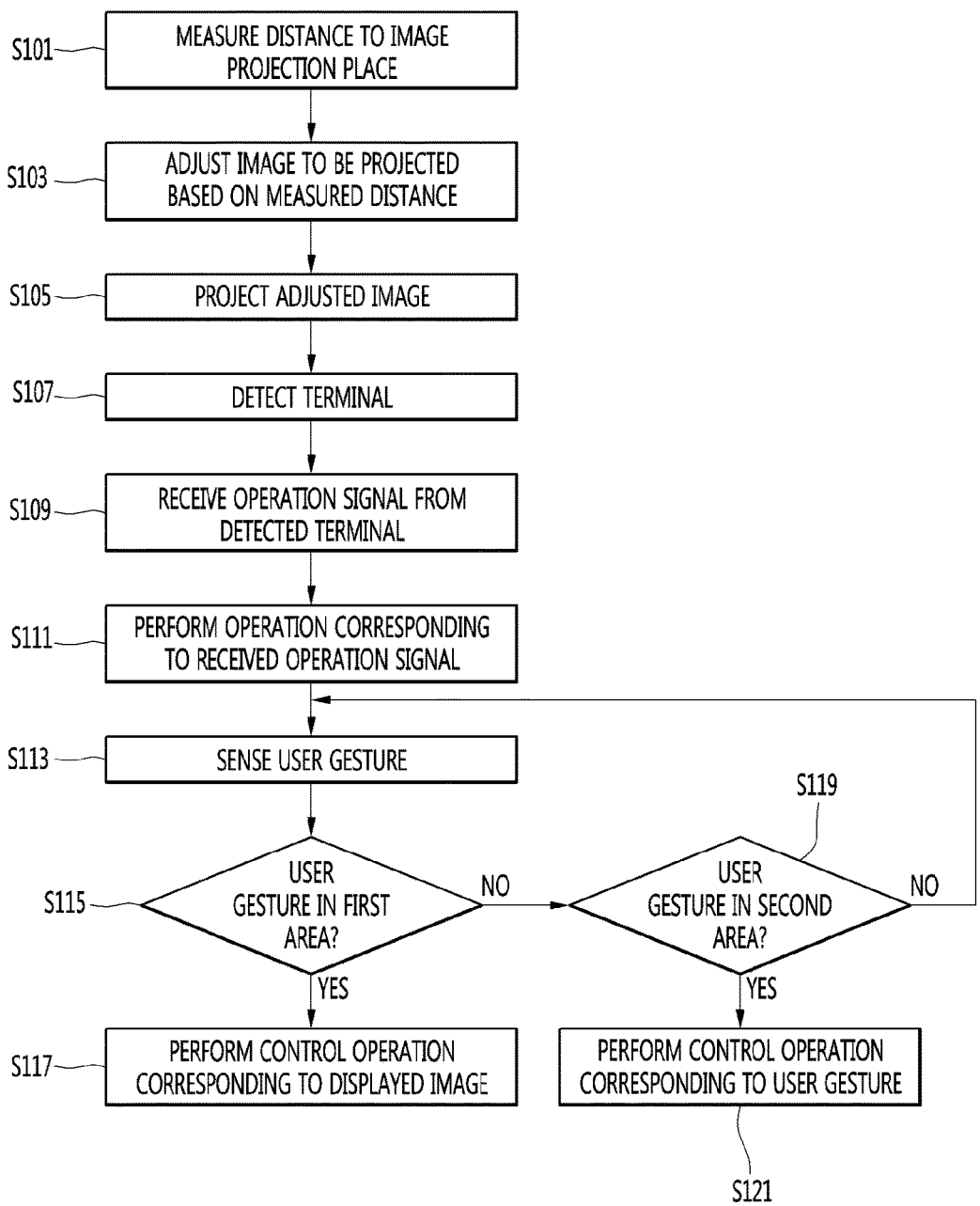
FIG. 5 is a flowchart illustrating a method of operating an image projection apparatus according to an embodiment of the present invention.

FIG. 5 is a flowchart illustrating a method of operating an image projection apparatus 100 according to an embodiment of the present invention.

Referring to FIG. 5, the controller 170 of the image projection apparatus 100 measures a distance to an image projection place through the sensing unit 105 (S101).

The sensing unit 105 may measure a distance to an image projection place. Here, the image projection place may also be referred to as an image screen area.

As an embodiment, the sensing unit 105 may measure a distance to one surface, onto which an image is projected, using a distance sensor 106. Thus, the controller 170 may acquire information on the distance from the sensing unit to the image projection place.

The controller 170 of the image projection apparatus 100 adjusts an image to be projected based on the measured distance (S103).

The controller 170 may adjust one or more of the focus, size and quality of the image to be projected based on the measured distance. For example, the controller 170 may adjust one or more of the focus, resolution, size, brightness, color and contrast of the image to be projected based on the measured distance.

The controller 170 of the image projection apparatus 100 controls the image projection unit 180 to project the adjusted image (S105).

The controller 170 may control the image projection unit 180 to project the adjusted image onto one image projection surface.

This will be described with reference to FIGS. 6 and 7.

Figure 6:
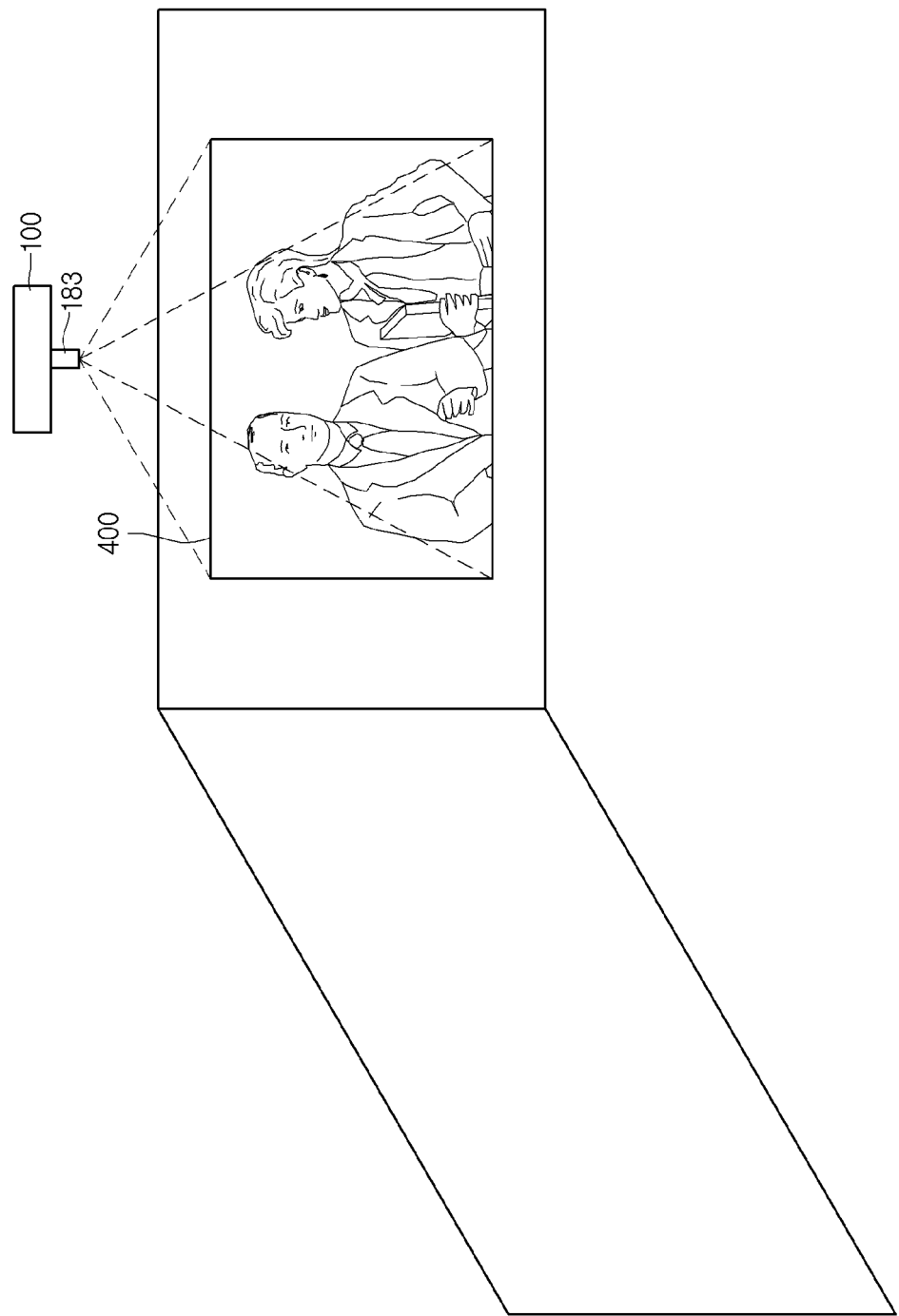
FIG. 6 is a diagram showing image projection according to an embodiment of the present invention.

FIG. 6 is a diagram showing image projection according to an embodiment of the present invention.

Referring to FIG. 6, the controller 170 may control the image projection unit 180 to project the adjusted image onto the image screen area. On the image projection surface, an image screen 400 may be displayed. Meanwhile, the reflection unit 183 of the image projection unit 180 may reflect the beam for the projected image on to the image projection surface.

Figure 7:
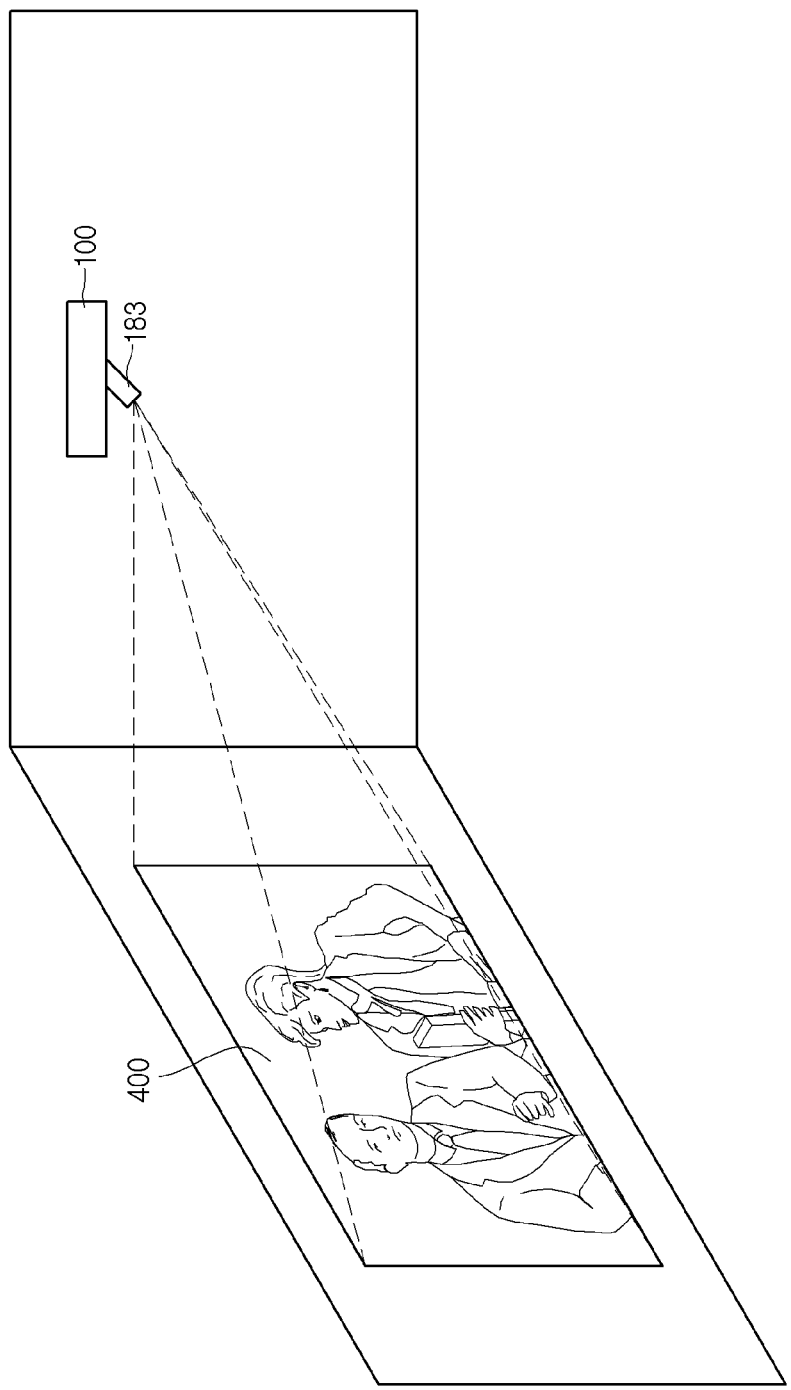
FIG. 7 is a diagram showing image projection according to another embodiment of the present invention.

FIG. 7 is a diagram showing image projection according to another embodiment of the present invention.

Referring to FIG. 7, the controller 170 may control the image projection unit 180 to project the adjusted image onto an image projection surface. An image screen 400 may be displayed on the image projection surface. Meanwhile, the reflection unit 183 of the image projection unit 180 may reflect the beam for the projected image onto an image projection surface. Here, the reflection unit 183 may adjust the reflection direction of the beam and project the image onto a surface different from the surface shown in FIG. 1. Thus, the image projection apparatus 100 may project the image in various directions by adjusting the reflection direction of the reflection unit 183.

FIG. 5 is referred to again.

The controller 170 of the image projection apparatus 100 detects the terminal 200 (S107).

The controller 170 may detect the terminal 200 located within a predetermined distance of the image projection apparatus 100.

As an embodiment, the controller 170 may generate a detection signal for detecting the terminal 200 and transmit the generated detection signal to the terminal 200 located within the predetermined distance through the communication unit 160. The controller 170 may receive a response signal from the terminal 200 through the communication unit 160.

As another embodiment, the controller 170 may receive a response signal according to operation for tagging the image projection apparatus 100 with the terminal 200. Here, the response signal according to the tagging operation may be a signal using a non-contact proximity wireless communication technology.

The controller 170 of the image projection apparatus 100 receives an operation signal from the detected terminal (S109).

The controller 170 may receive an operation signal related to operation of the image projection apparatus 100 from one or more detected terminals 200 through the communication unit 160.

Here, the operation signal may be a signal for controlling the image projection apparatus 100, an image signal for an image projected by the image projection apparatus 100 or a sound signal for output of sound. In addition, the operation signal may be a signal for displaying the screen displayed on the terminal 200 on the image screen 400 through the image projection apparatus 100 and outputting sound output from the terminal.

The controller 170 of the image projection apparatus 100 performs operation corresponding to the received operation signal (S111).

The controller 170 may perform operation corresponding to the operation signal received from the terminal 200 and operation corresponding to the received operation signal may include various operations performed by the terminal 200. For example, operation corresponding to the operation signal received from the terminal 200 may include operation related to a voice call, data communication, video communication and application execution.

This will be described with reference to FIGS. 8 and 9.

Figure 8:
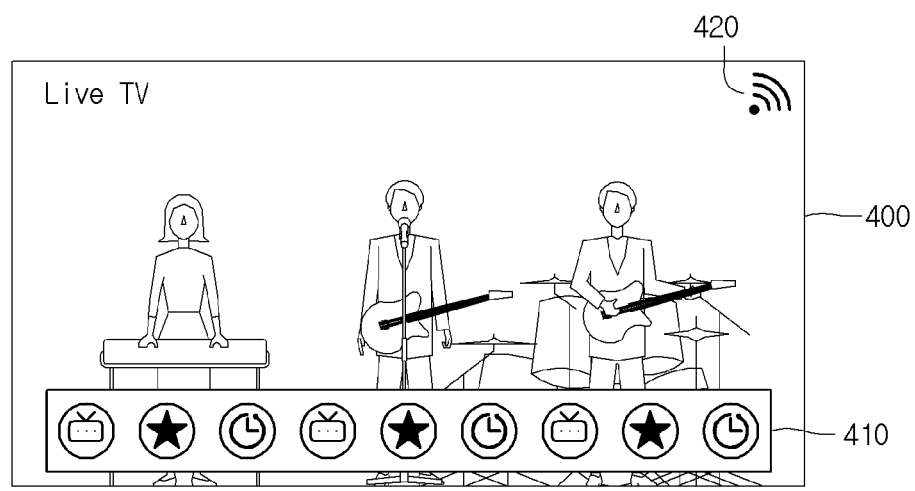
FIG. 8 is a diagram showing display of a connected terminal according to an embodiment of the present invention.

FIG. 8 is a diagram showing display of a connected terminal according to an embodiment of the present invention.

Referring to FIG. 8, the controller 180 may display a terminal connection icon 420 indicating that one or more terminals 200 are detected and connected in the image projected by the image projection unit 180. The terminal connection icon 420 may be displayed on the image screen 400 according to the image projected by the image projection unit 180.

In addition, the controller 170 may receive the operation signal from the detected terminal 200 and output various image screens 400 and sound related to operation of the terminal 200. For example, the controller 170 may receive the operation signal for one or more of an incoming call, a message and an alarm of the terminal 200 and output one or more of the image screen 400 and sound corresponding to the received operation signal.

Figure 9:
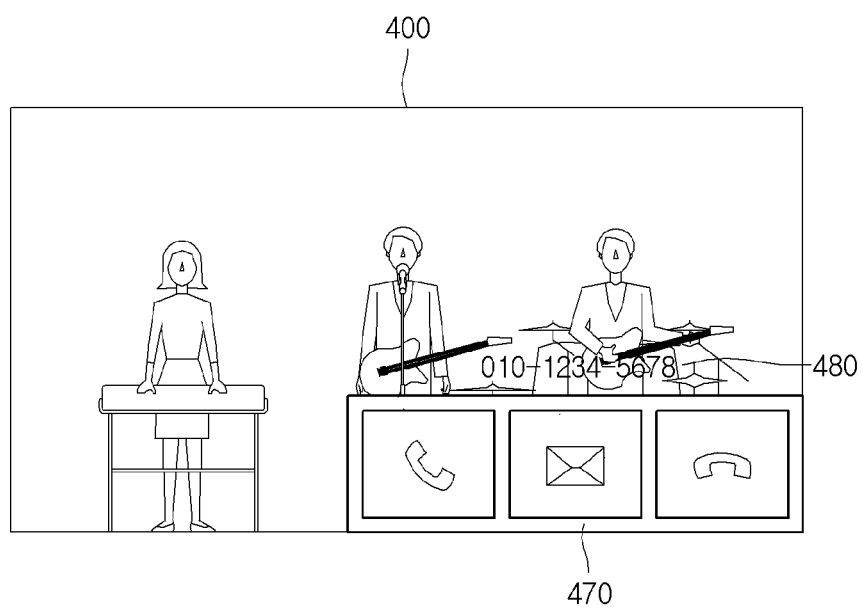
FIG. 9 is a diagram showing an image screen upon an incoming call according to an embodiment of the present invention.

FIG. 9 is a diagram showing an image screen upon an incoming call according to an embodiment of the present invention.

The controller 170 may receive the operation signal for the incoming call from the detected terminal 200 through the communication unit 160. The controller 170 may display an incoming call notification window 470 on the image screen 400 corresponding to the operation signal for the incoming call. The incoming call notification window 470 may be displayed on the image window 400 according to the image projected by the image projection unit 180 and information 480 on a caller may be displayed. Here, the information on the caller may include one or more of the telephone number, name, photo and memo of the caller.

The above-described example serves to illustrate operation of the controller 170 performed in correspondence with the operation signal received from the terminal 200, without being limited thereto. Accordingly, the image projection apparatus 100 may perform various operations capable of being performed by the terminal 200 according to selection of the user or designer.

FIG. 5 will be referred to again.

The controller 170 of the image projection apparatus 100 senses a user gesture (S113).

The controller 170 may sense a user gesture through one or more of the sensing unit 105 and the image acquisition unit 120.

As an embodiment, the controller 170 may acquire information on motion of the user through one or more sensors included in the sensing unit 105 and sense the user gesture based on the acquired information.

As another embodiment, the controller 170 may recognize motion of the user based on the image of the user acquired by the image acquisition unit 120 and sense the user gesture based on the recognized motion.

Meanwhile, the controller 170 may sense user input in an area between the image projection apparatus 100 and the projected image screen 400. In addition, the controller 170 may divide the area between the image projection apparatus 100 and the projected image screen 400 into a plurality of areas and sense user input in each of the plurality of areas. Here, the area between the image projection apparatus 100 and the image screen 400 may be referred to as a gesture area 500.

This will be described with reference to FIG. 10.

Figure 10:
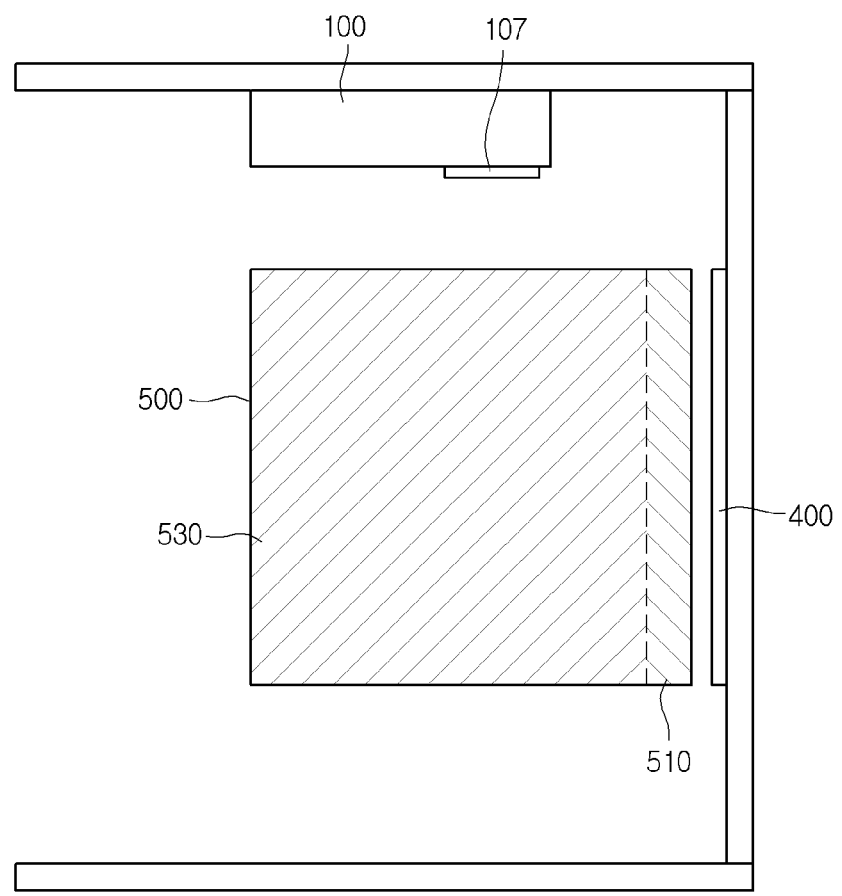
FIG. 10 is a user gesture area according to an embodiment of the present invention.

FIG. 10 is a user gesture area according to an embodiment of the present invention.

Referring to FIG. 10, the gesture area 500 between the image projection apparatus 100 and the image screen 400 may be divided into a first gesture area 510 and a second gesture area 530.

As an embodiment, the motion sensor 107 of the image projection apparatus 100 may sense user motion in the gesture area 500. The controller 170 may acquire information on user motion from the motion sensor 107 and sense a user gesture. The controller 170 may identify user motion in the first gesture area 510 or the second gesture area 530 of the gesture area 500 based on the acquired information on user motion. The controller 170 may perform operation corresponding to the area. Hereinafter, this will be described in detail.

FIG. 5 is referred to again.

The controller 170 of the image projection apparatus 100, if it is determined that the sensed user gesture is in the first gesture area (S115), performs control operation corresponding to the displayed image screen (S117).

The controller 170 may perform control operation corresponding to the displayed image screen 400 if the user gesture sensed by the sensing unit 105 is in the first gesture area 510. Here, the control operation corresponding to the displayed image screen 400 may correspond to one of a menu, a notification window, a popup window and a control bar displayed on the image screen 400.

This will be described with reference to FIGS. 11 to 15.

Figure 11:
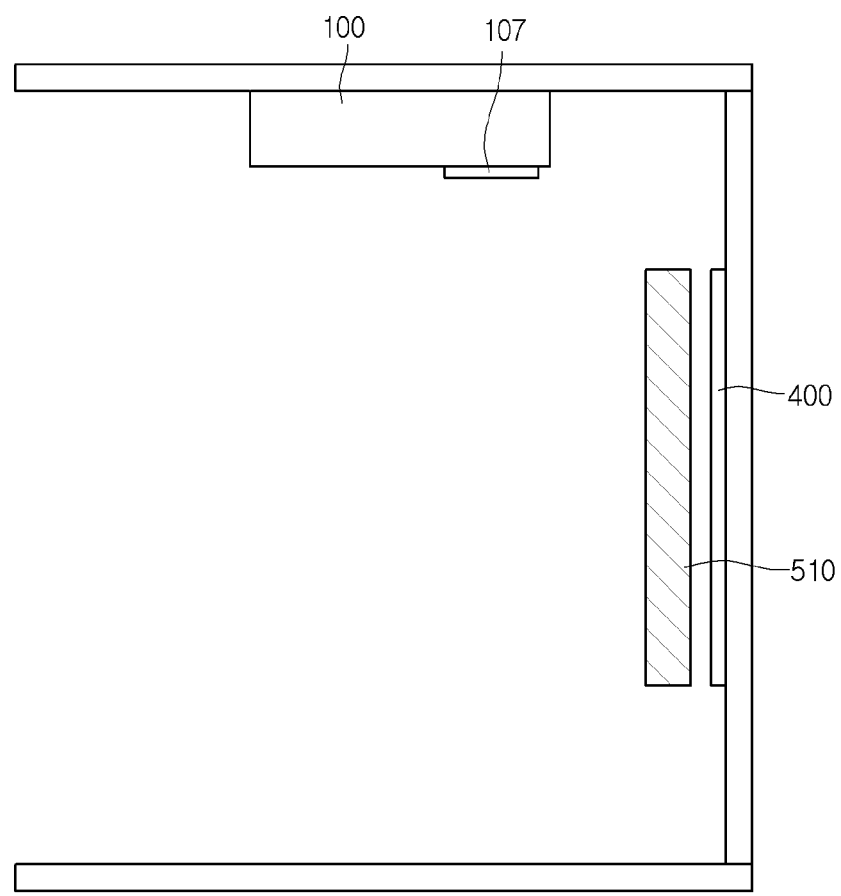
FIG. 11 is a diagram showing a first gesture area according to an embodiment of the present invention.

FIG. 11 is a diagram showing a first gesture area according to an embodiment of the present invention.

Referring to FIG. 11, the first gesture area 510 may be an area located within a predetermined distance from the image screen 400 between the image projection apparatus 100 and the image screen 400. Here, the predetermined distance to the first gesture area 510 may be variously set according to selection of the user or designer.

An embodiment of control operation corresponding to a user gesture in the first gesture area 510 will be described with reference to FIGS. 12 to 13.

Figure 12:
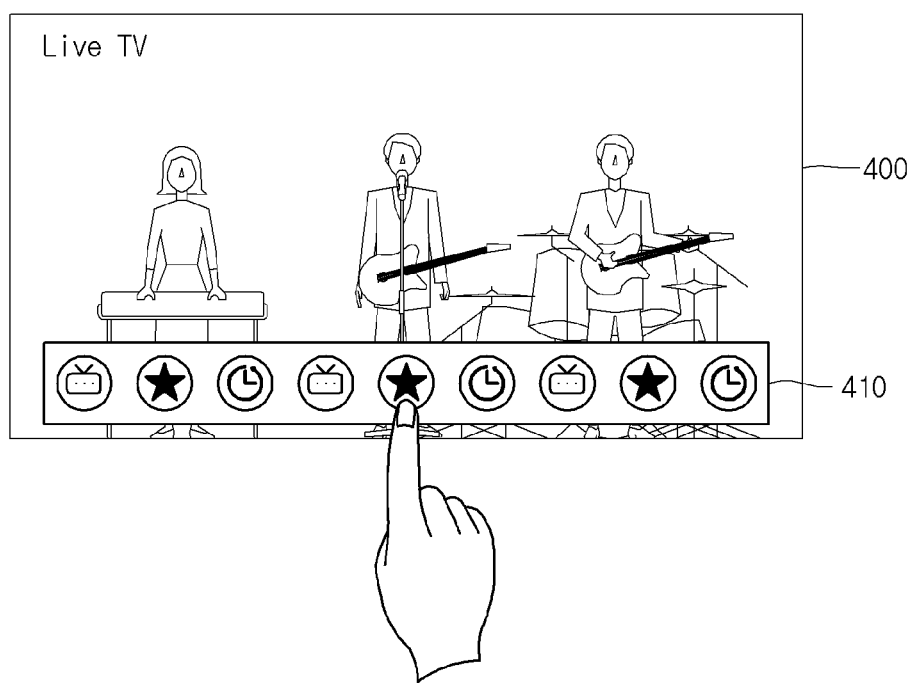
FIG. 12 is a diagram showing a menu display screen according to an embodiment of the present invention.

FIG. 12 is a diagram showing a menu display screen according to an embodiment of the present invention.

Figure 13:
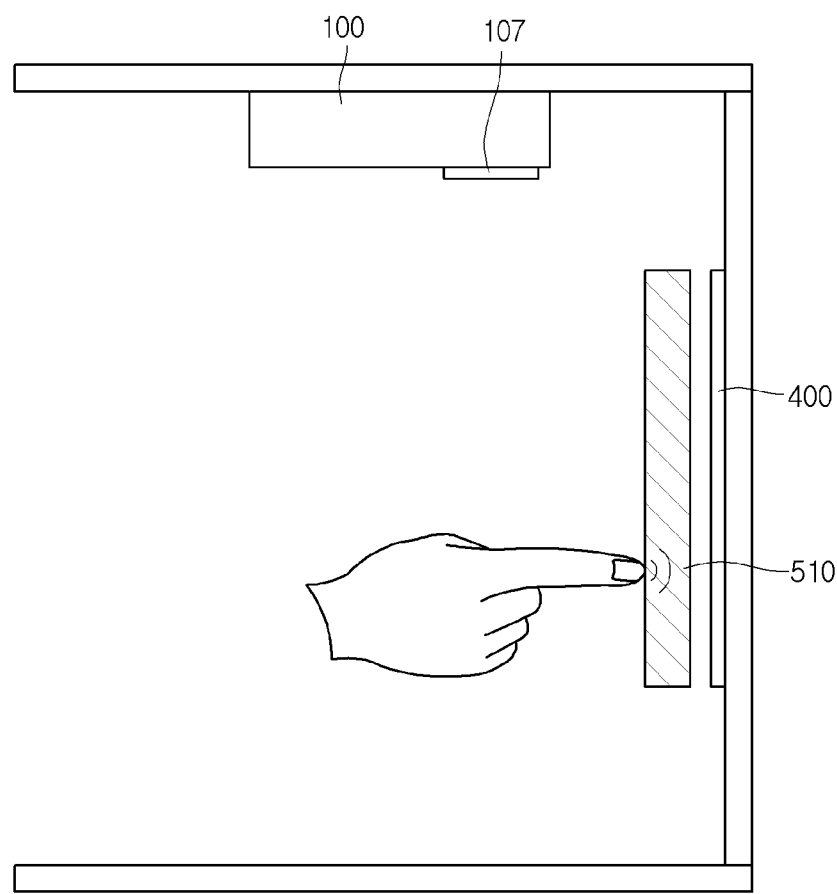
FIG. 13 is a diagram showing user input for a menu display screen according to an embodiment of the present invention.

FIG. 13 is a diagram showing user input for a menu display screen according to an embodiment of the present invention.

Referring to FIG. 12, the controller 170 may project the image screen 400 including the menu window 410 related to the function of the image projection apparatus 100 through the image projection unit 180. Thus, a screen corresponding to the image signal and the menu window 410 may be displayed on the projected image screen 400. The controller 170 may acquire user input corresponding to the menu window 410 through the motion sensor 107 included in the sensing unit 105. Here, user input corresponding to the menu window 410 may be user input for selecting one of the menus displayed in the menu window 410. The user input corresponding to the menu window 410 may be user gesture input in the first gesture area 510. This will be described in detail with reference to FIG. 13.

Referring to FIG. 13, the controller 170 may recognize user gesture input in the first gesture area 510 through the motion sensor 107. The controller 170 may perform control operation corresponding to the image screen 400 displayed based on the user gesture input in the first gesture area 510. Thus, the controller 170 may perform operation corresponding to the selected menu window 410 based on user input in the first gesture area 510 and the menu window 410 of the image screen 400 corresponding to the user input.

Another embodiment of control operation corresponding to the user gesture in the first gesture area 510 will be described with reference to FIGS. 14 to 15.

Figure 14:
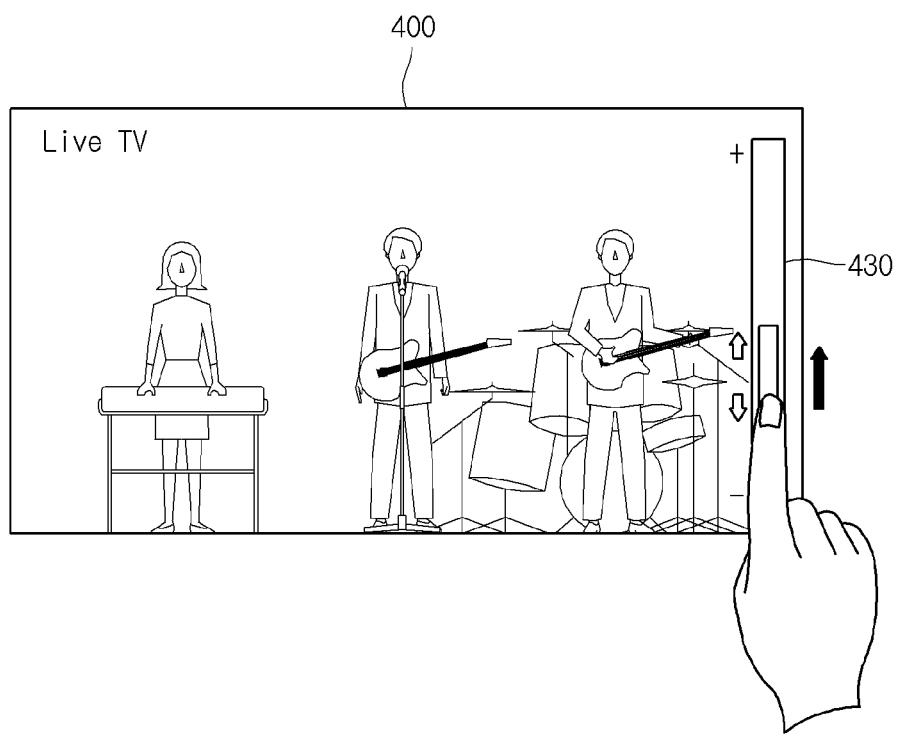
FIG. 14 is a diagram showing a volume control screen according to an embodiment of the present invention.

FIG. 14 is a diagram showing a volume control screen according to an embodiment of the present invention.

Figure 15:
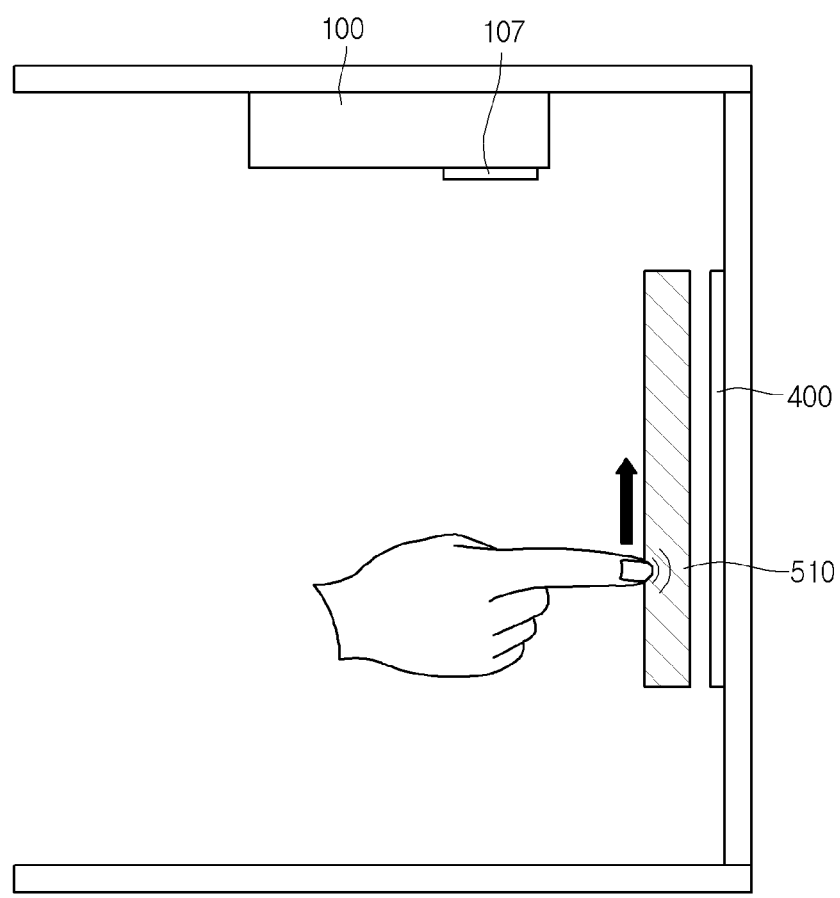
FIG. 15 is a diagram showing user input for a volume control screen according to an embodiment of the present invention.

FIG. 15 is a diagram showing user input for a volume control screen according to an embodiment of the present invention.

Referring to FIG. 14, the controller 170 may project the image screen 400 including the volume control bar 430 related to the volume of the image projection apparatus 100 through the image projection unit 180. Thus, a screen corresponding to an image signal and the volume control bar 430 may be displayed on the projected image screen 400. The controller 170 may acquire user input corresponding to the volume control bar 430 through the motion sensor 107 included in the sensing unit 105. Here, the user input corresponding to the volume control bar 430 may be user input for moving the location of a control tap displayed in the volume control bar 430. The user input corresponding to the volume control bar 430 may be user gesture input in the first gesture area 510. This will be described in detail with reference to FIG. 15.

Referring to FIG. 15, the controller 170 may recognize user gesture input in the first gesture area 510 through the motion sensor 107. The controller 170 may perform control operation corresponding to the image screen 400 displayed based on the user gesture input in the first gesture area 510. Thus, the controller 170 may perform operation corresponding to the moved volume control tap based on the user input in the first gesture area 510 and the volume control bar 430 of the image screen 400 corresponding to the user input.

The controller 170 may perform operation corresponding to the user input in the first gesture area 510 based on the user gesture and the displayed image screen 400.

Operation corresponding to the user input in the first gesture area 510 is mere exemplary and the present invention is not limited thereto. Accordingly, operation corresponding to the user input in the first gesture area 510 may be variously set according to selection of the user or designer.

FIG. 5 is referred to again.

The controller 170 of the image projection apparatus 100, if it is determined that the sensed user gesture is in the second gesture area (S119), performs control operation corresponding to the sensed user gesture (S121).

The controller 170 may perform control operation corresponding to the sensed user gesture, if it is determined the user gesture sensed through the sensing unit 105 is in the second gesture area 510.

This will be described with reference to FIGS. 16 to 20.

Figure 16:
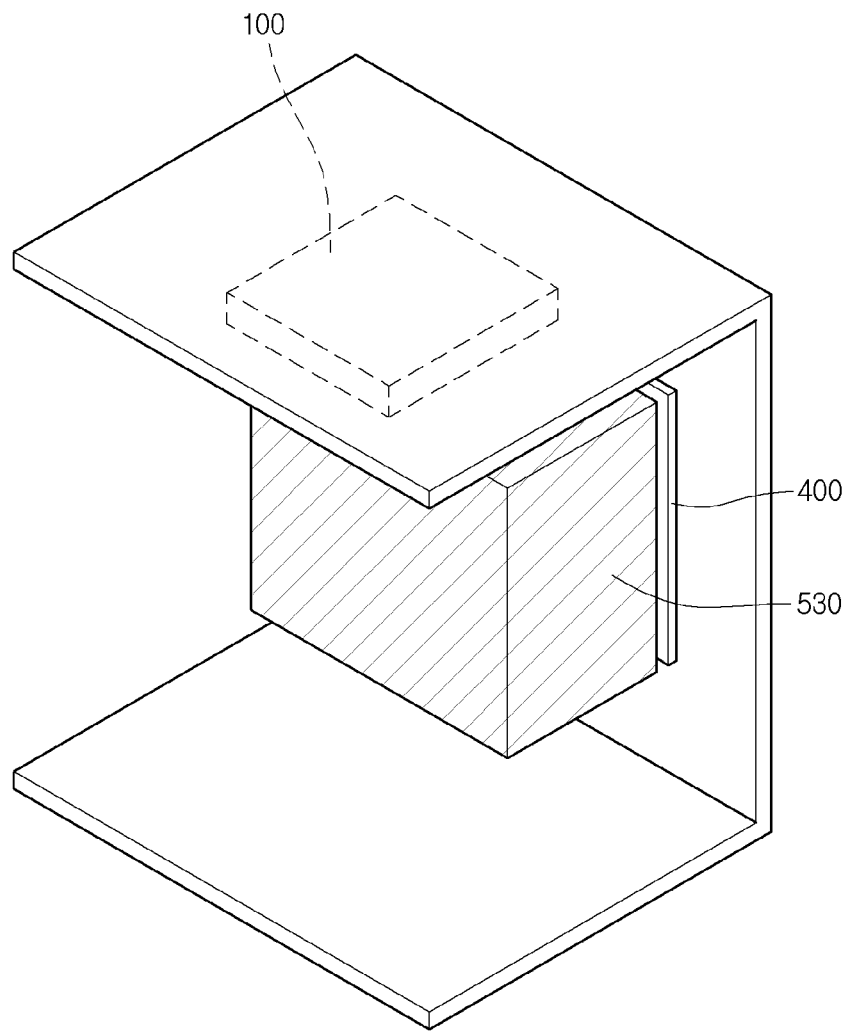
FIG. 16 is a diagram showing a second gesture area according to an embodiment of the present invention.

FIG. 16 is a diagram showing a second gesture area according to an embodiment of the present invention.

Referring to FIG. 16, the second gesture area 530 may be an area outside the predetermined distance from the image screen 400 in the area between the image projection apparatus 100 and the image screen 400. Accordingly, the second gesture area 530 may be an area obtained by excluding the first gesture area 510 of the gesture area 500.

An embodiment of control operation corresponding to the user gesture in the second gesture area 530 will be described with reference to FIGS. 17 to 18.

Figure 17:
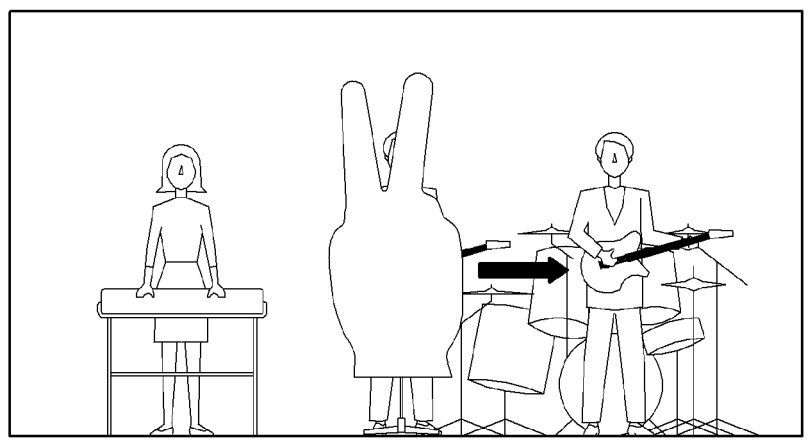
FIG. 17 is a diagram showing user gesture input according to an embodiment of the present invention.

FIG. 17 is a diagram showing user gesture input according to an embodiment of the present invention.

Figure 18:
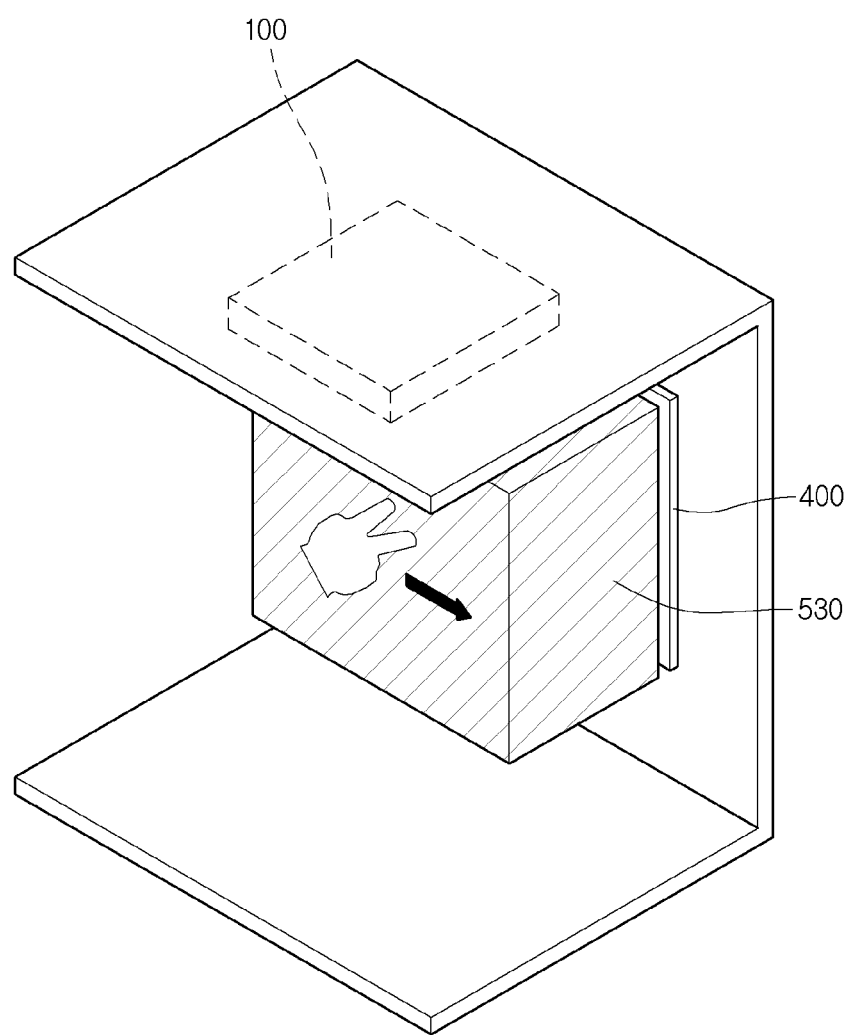
FIG. 18 is a diagram showing user input in the second gesture area according to an embodiment of the present invention.

FIG. 18 is a diagram showing user input in the second gesture area according to an embodiment of the present invention.

Referring to FIG. 17, the controller 170 may project the image screen 400 according to the image signal through the image projection unit 180. Thus, the screen corresponding to the image signal may be displayed on the projected image screen 400. The controller 170 may acquire user gesture input through the motion sensor 107 included in the sensing unit 105. Here, the gesture input may be a user gesture moving in the right direction of the image screen 400. The user gesture moving in the right direction of the image screen 400 may be user gesture input in the second gesture area 530. This will be described in detail with reference to FIG. 18.

Referring to FIG. 18, the controller 170 may recognize the user gesture input in the second gesture area 530 through the motion sensor 107. The controller 170 may perform control operation for switching the channel of the displayed image screen 400 to another channel based on the user gesture input in the second gesture area 530. Thus, the controller 170 may switch the channel of the displayed image screen 40 to another channel when acquiring the user gesture input moving in the right direction in the second gesture area 530.

Meanwhile, the controller 170 may perform control operation for switching the channel of the displayed image screen 400 to another channel when acquiring user gesture input moving in the left direction in the second gesture area 530. The switched channel may be different from the channel switched according to the user gesture input moving in the right direction.

Another embodiment of control operation corresponding to the user gesture in the second gesture area 530 will be described with reference to FIGS. 19 to 20.

Figure 19:
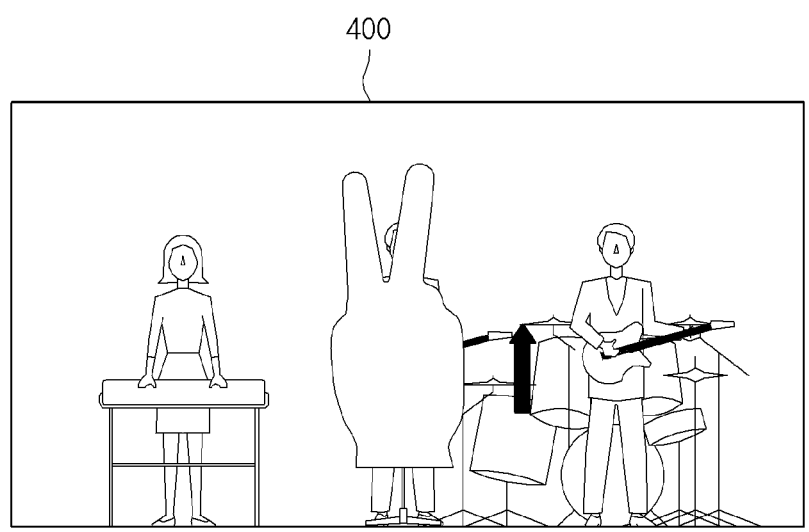
FIG. 19 is a diagram showing user gesture input according to another embodiment of the present invention.

FIG. 19 is a diagram showing user gesture input according to another embodiment of the present invention.

Figure 20:
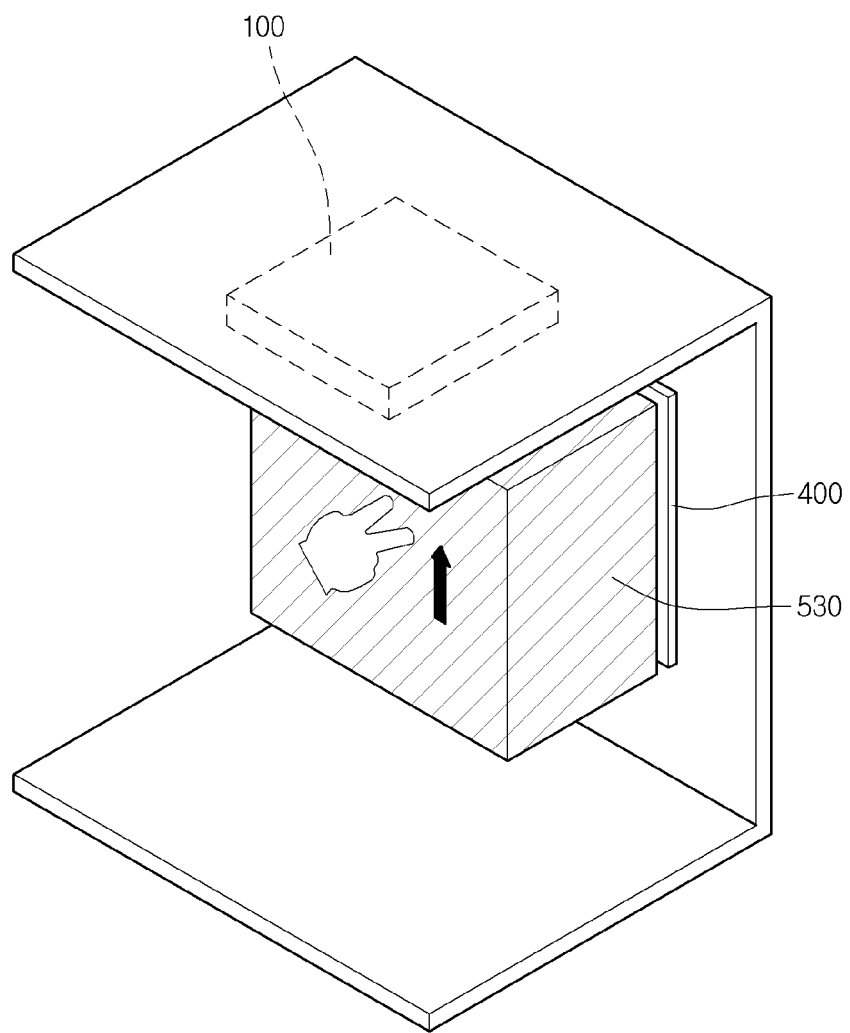
FIG. 20 is a diagram showing user input in the second gesture area according to another embodiment of the present invention.

FIG. 20 is a diagram showing user input in the second gesture area according to another embodiment of the present invention.

Referring to FIG. 19, the controller 170 may project the image screen 400 according to the image signal through the image projection unit 180. Thus, the screen corresponding to the image signal may be displayed on the projected image screen 400. The controller 170 may acquire user gesture input through the motion sensor 107 included in the sensing unit 105. Here, the gesture input may be a user gesture moving in an upper direction of the image screen 400. The user gesture moving in the upper direction of the image screen 400 may be user gesture input in the second gesture area 530. This will be described in detail with reference to FIG. 20.

Referring to FIG. 20, the controller 170 may recognize the user gesture input in the second gesture area 530 through the motion sensor 107. The controller 170 may perform operation for increasing the volume of sound corresponding to the displayed image screen 400 based on the user gesture input in the second gesture area 530. Thus, the controller 170 may increase the volume of sound corresponding to the displayed image screen 400 when acquiring the user gesture input moving in the upper direction in the second gesture area 530.

The controller 170 may decrease the volume of sound corresponding to the displayed image screen 400 when acquiring user gesture input moving in the lower direction within the second gesture area 530.

Another embodiment of control operation corresponding to a user gesture in the second gesture area 530 will be described with reference to FIGS. 21 to 22.

Figure 21:
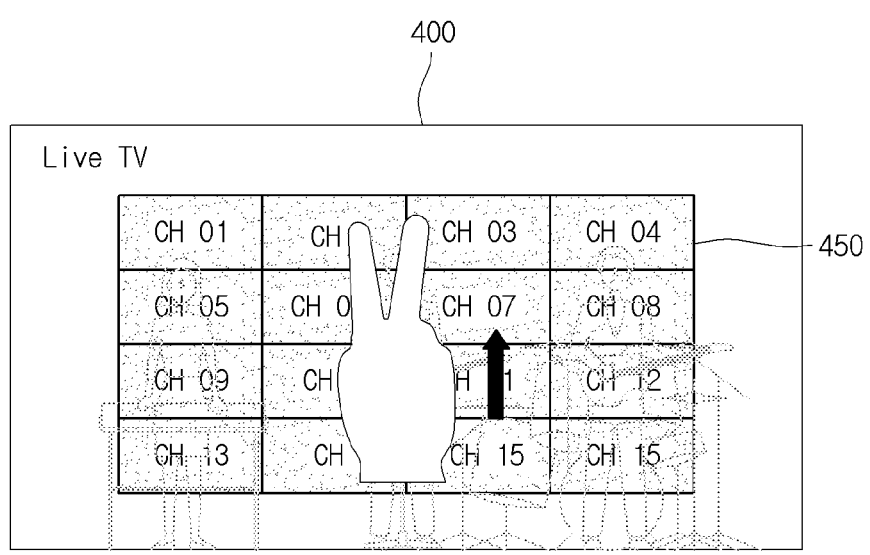
FIG. 21 is a diagram showing an entire channel list display screen according to an embodiment of the present invention.

FIG. 21 is a diagram showing an entire channel list display screen according to an embodiment of the present invention.

Figure 22:
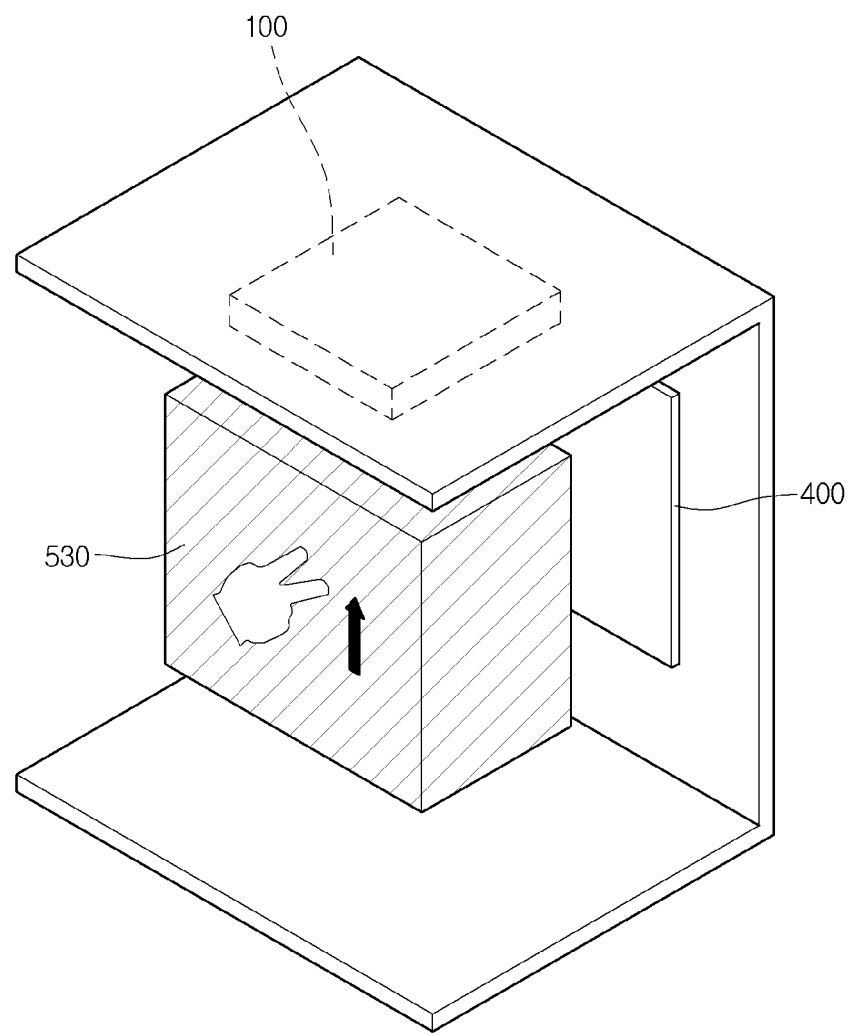
FIG. 22 is a diagram showing user input in the second gesture area according to another embodiment of the present invention.

FIG. 22 is a diagram showing user input in the second gesture area according to another embodiment of the present invention.

Referring to FIG. 21, the controller 170 may project the image screen 400 including an entire channel list 450 indicating a list of channels through the image projection unit 180. Thus, a screen corresponding to the image signal and the entire channel list 450 may be displayed on the projected image screen 400. The controller 170 may acquire user input through the motion sensor 107 included in the sensing unit 105. Here, the gesture input may be a user gesture moving in the upper direction of the image screen 400. The user gesture moving in the upper direction of the image screen 400 may be user gesture input in the second gesture area 530. This will be described in detail with reference to FIG. 22.

Referring to FIG. 22, the controller 170 may recognize user gesture input in the second gesture area 530 through the motion sensor 107. The controller 170 may perform control operation for scrolling the entire channel list 450 included in the displayed image screen 400 in the upper direction based on the user gesture input in the second gesture area 530. The controller 170 may scroll the entire channel list 450 included in the displayed image screen 400 in the upper direction when acquiring the user gesture input moving in the upper direction in the second gesture area 530.

Meanwhile, the controller 170 may scroll the entire channel list 450 included in the displayed image screen 400 in the lower direction when acquiring the user gesture input moving in the lower direction in the second gesture area 530.

The controller 170 may perform operation corresponding to the user input in the second gesture area 530 based on the user gesture.

Operation corresponding to the user input in the second gesture area 530 is exemplary and the present invention is not limited thereto. Accordingly, operation corresponding to the user input in the second gesture area 530 may be variously set according to selection of the user or designer.

The image projection apparatus 100 according to the present invention can project an image according to a distance to an image projection place, thereby providing a high-quality image.

In addition, in the present invention, it is possible to output an operation screen and sound of the connected terminal 200 through the image projection apparatus 100.

In addition, in the present invention, it is possible to perform various control operations based on user input in an area between the image projection apparatus 100 and the image screen 400. Since it is possible to perform different control operations according to the distance to the image screen 400, the user can easily control the image projection apparatus 100 without direct input to the image projection apparatus 100 or the input device.

According to various embodiments of the present invention, since it is possible to project an image corresponding to a distance of an image projection place, it is possible to provide a user with a high-quality image.

In addition, in the present invention, since various user gestures related to a projected image can be recognized, it is possible to easily perform operations and functions desired by a user.

According to one embodiment of the present invention, the above-described method may be implemented as code that can be written to a processor-readable recording medium and can thus be read by a processor. Examples of the processor-readable recording medium include a ROM, a RAM, a CD-ROM, a magnetic tape, a floppy disk, optical data storage, and a carrier wave (e.g., data transmission over the Internet).

The above-described image projection apparatus is not limited to the configurations and the methods of the above-described embodiments and some or all of the above-described embodiments may be combined to be variously modified.

What is claimed is:

1. A method of operating an image projection apparatus, the method comprising:
    projecting an image;
    sensing a user gesture in an area between an image screen area, in which an image screen corresponding to the projected image is displayed, and the image projection apparatus,
    wherein the area between the image screen area and the image projection apparatus is divided into a plurality of areas including a first gesture area and a second gesture area,
    wherein the first gesture area is an area within a predetermined distance from the image screen area,
    wherein the second gesture area is an area outside the predetermined distance from the image screen area such that a distance between the first gesture area and the image screen area is less than a distance between the second gesture area and the image screen area, and
    wherein both the first gesture area and the second gesture area are located in the area between the image screen area and the image projection apparatus; and
    performing a control operation corresponding to the sensed user gesture such that a different control operation is performed according to one of the first and second gesture areas in which the user gesture is sensed,
    wherein the sensing the user gesture comprises sensing a first user gesture or a second user gesture, wherein the first user gesture is sensed in the first gesture area and the second user gesture is sensed in the second gesture area,
    wherein the performing the control operation comprises:
        performing a first control operation when the sensed user gesture is the first user gesture,
        wherein the first control operation is a control operation for controlling items displayed on the projected image; and
        performing a second control operation when the sensed user gesture is the second user gesture,
        wherein the second control operation is a control operation for controlling an attribute of content of the projected image without requiring displaying of the items on the projected image prior to performing the second control operation.

2. The method according to claim 1, further comprising:
    measuring a distance to the image screen area; and
    adjusting the projected image based on the measured distance.

3. The method according to claim 2, wherein the adjusting the projected image comprises adjusting one or more of focus, resolution, size, brightness, color, or contrast of the projected image.

4. The method according to claim 1, further comprising:
    detecting a terminal within a predetermined distance of the image projection apparatus;
    receiving an operation signal related to operation of the detected terminal from the detected terminal; and performing an operation corresponding to the received operation signal.

5. The method according to claim 4, wherein the operation signal includes a signal for at least one operation related to a voice call, data communication, video communication, or application execution of the detected terminal.

6. The method according to claim 1, wherein the items comprise at least one of a menu, a notification window, a popup window, or a control bar displayed on the projected image.

7. The method according to claim 1, wherein the second control operation comprises at least one of switching a channel associated with the content or controlling an audio volume associated with the content.

8. The method according to claim 1, wherein the second control operation is performed differently based on a direction of the second user gesture.

9. An image projection apparatus comprising:
an image projection unit configured to project an image;
a sensing unit configured to sense a user gesture in an area between an image screen area, in which an image screen corresponding to the projected image is displayed, and the image projection apparatus,
wherein the area between the image screen area and the image projection apparatus is divided into a plurality of areas including a first gesture area and a second gesture area,
wherein the first gesture area is an area within a predetermined distance from the image screen area,
wherein the second gesture area is an area outside the predetermined distance from the image screen area such that a distance between the first gesture area and the image screen area is less than a distance between the second gesture area and the image screen area, and
wherein both the first gesture area and the second gesture area are located in the area between the image screen area and the image projection apparatus; and
a controller configured to:
perform a control operation corresponding to the user gesture sensed by the sensing unit such that a different control operation is performed according to one of the first and second gesture areas in which the user gesture is sensed,
wherein the sensed user gesture comprises a first user gesture sensed in the first gesture area or a second user gesture sensed in the second gesture area;
perform a first control operation when the sensed user gesture is the first user gesture,
wherein the first control operation is a control operation for controlling items displayed on the projected image; and
perform a second control operation when the sensed user gesture is the second user gesture,
wherein the second control operation is a control operation for controlling an attribute of content of the projected image without requiring displaying of the items on the projected image prior to performing the second control operation.

10. The image projection apparatus according to claim 9, wherein the sensing unit measures a distance to the image screen area, and the controller adjusts the projected image based on the measured distance.

11. The image projection apparatus according to claim 10, wherein the controller is further configured to adjust one or more of focus, resolution, size, brightness, color, or contrast of the projected image based on the measured distance.

12. The image projection apparatus according to claim 9, further comprising a communication unit, wherein the controller is further configured to:
detect a terminal within a predetermined distance of the image projection apparatus;
receive an operation signal related to operation of the detected terminal from the detected terminal via the communication unit; and
perform an operation corresponding to the received operation signal.

13. The image projection apparatus according to claim 12, wherein the operation signal includes a signal for at least one operation related to a voice call, data communication, video communication, or application execution of the detected terminal.

14. The image projection apparatus according to claim 9, wherein the items comprise at least one of a menu, a notification window, a popup window, or a control bar displayed on the projected image.

15. The image projection apparatus according to claim 9, wherein the second control operation comprises at least one of switching a channel associated with the content or controlling an audio volume associated with the content.

16. The image projection apparatus according to claim 9, wherein the second control operation is performed differently based on a direction of the second user gesture.

* * * * *